Aug. 18, 1942.  D. H. FRIEDMAN, JR  2,293,538
APPARATUS FOR AND METHOD OF TRADE-MARKING ICE CREAM
Filed Aug. 6, 1940  2 Sheets-Sheet 1
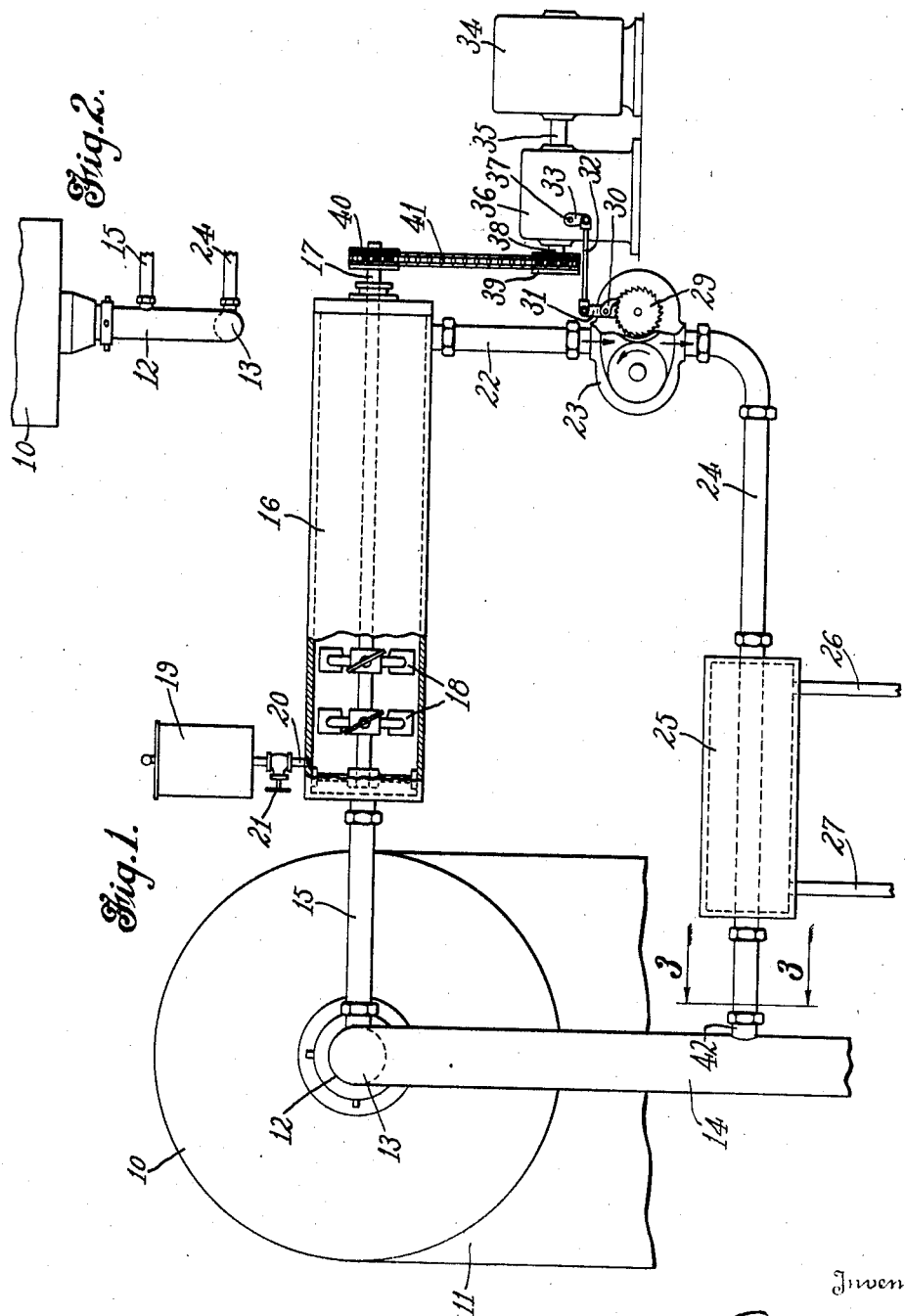
Inventor
David H. Friedman Jr.
By Rockwell Bartholow
Attorneys Aug. 18, 1942.   D. H. FRIEDMAN, JR   2,293,538
APPARATUS FOR AND METHOD OF TRADE-MARKING ICE CREAM
Filed Aug. 6, 1940   2 Sheets-Sheet 2

Inventor
David H. Friedman Jr.
By Rockwell Buckelew
Attorneys

Patented Aug. 18, 1942

2,293,538

UNITED STATES PATENT OFFICE 2,293,538

APPARATUS FOR AND METHOD OF TRADE-MARKING ICE CREAM

David H. Friedman, Jr., New Haven, Conn.

Application August 6, 1940, Serial No. 351,571

11 Claims. (Cl. 107—1)

This invention relates to branding or trademarking ice cream, and particularly to a method of performing this result which may be performed while the ice cream is in transit between the freezer and the container into which it is packed. I also contemplate the provision of an apparatus for putting the invention into practice.

In the manufacture of ice cream, and particularly of bulk ice cream, it has not been possible in the past to provide the ice cream with a trademark or brand mark which will be seen by the ultimate consumer. Much of this ice cream is sold over the counter from large containers, and when dished out of the container all ice cream of the same flavor will look more or less alike, regardless of the source of the product, and the consumer may never be sure that he secures the product of any particular manufacturer. The same may be true to some extent of packaged ice cream, although in this instance the packages may be plainly marked, and there is less likelihood of the practice of deceit.

At the present time it is the custom to produce ice cream by means of a continuous freezing process. The mix is fed into a freezing chamber in which there is a refrigerant, the mix being carried through the chamber in a tube or conduit under pressure, and forced along a continuation of the tube after it leaves the freezing chamber to the nozzle or other outlet, where it is delivered to the container in which it is to be packed and sold. I contemplate by the present invention to provide means for injecting into the column of ice cream after it leaves the freezer a mass or masses of ice cream of a slightly different color, so that when the product emerges from the nozzle there will be enclosed within the column the substance of different color which will be distributed throughout the mass in the container to which the cream is delivered. In this way, when the cream is scooped from the container by the dealer, a part of the trade-mark substance will appear in the scoopful of cream, so that the consumer will be able to recognize the brand mark, and therefore know the source of the product.

While I have referred particularly to ice cream, it will be understood that the method and apparatus is applicable to frozen desserts of all kinds, and also may be employed in connection with other plastic substances.

One object of the invention is the provision of a novel method of branding or trade-marking ice cream or similar products.

Another object of the invention is the provision of an apparatus which may be employed for trade-marking or branding ice cream or the like, whereby the product may be branded during the course of its travel from the freezer to the container in which it is sold.

A still further object of the invention is the provision of a method for branding ice cream or the like whereby a portion of the ice cream is drawn from the delivery tube, subjected to a coloring operation whereby it will be made slightly darker than the original product, and then returned to the column of ice cream prior to the delivery thereof to the container in the form of a slug or pencil, whereby the slug or pencil will be embraced by the column of cream dropping into the container, and will be uniformly distributed throughout the mass.

A still further object of the invention is the provision of an apparatus for carrying out the method above referred to.

To these and other ends the invention consists in the novel features and combinations of parts to be hereinafter described and claimed.

In the accompanying drawings:

Fig. 1 is an elevational diagrammatic view partly in section of my apparatus for trade-marking ice cream;

Fig. 2 is a fragmentary top plan view of the freezer and associated parts;

Figure 3:
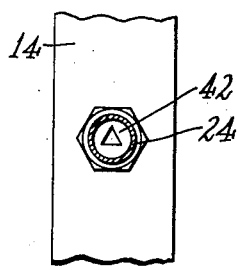
Fig. 3 is a sectional view on line 3—3 of Fig. 1.

To illustrate my improved process of trademarking ice cream, and also an apparatus for practicing this process, I have shown at 10 the drum of an ice cream freezer of the usual form, such, for example, as the usual continuous freezer in common use at this time, the drum being supported upon the casing 11. It will be understood that a suitable refrigerant will be supplied to the chamber within the drum 10, and through this chamber the ice cream mix will be forced in the usual manner, the frozen mix emerging from the chamber through the pipe or conduit 12, which, as shown more especially in Fig. 2, may be horizontally arranged. The conduit 12 may be provided with an elbow 13 beyond which point the pipe turns downwardly, as shown at 14, and is provided with a suitable nozzle or delivery device (not shown) from which the frozen mixture passes to the container for delivery. It is usual for the ice cream, after being passed through the freezing chamber, to be at a temperature of 20° or 22°, the mixture at this temperature being somewhat plastic so that it may be forced through the conduits 12 and 14 without too great resistance.

It is contemplated by the present invention to remove a part of the frozen mixture from the tubes 12 or 14 and return this part of the product after treating the same so that it may be used to brand or trade-mark the remainder. For this purpose I have shown a pipe or conduit 15, which in this instance is connected to the conduit 12, and which conduit 15 leads to a chamber 16.

A shaft 17 is rotatably mounted in the chamber 16, and on this shaft are provided a plurality of paddles or agitators 18, which will serve to keep the product in the chamber 16 stirred in an efficient manner to mix evenly therewith coloring material supplied from the container 19 through the pipe 20. A valve 21 may be provided in the pipe 20 to regulate the amount of material delivered to the drum 16. It will be understood that the coloring matter 19 may be of any desirable coloring material, or may if desired be a flavoring material, which would not only color but give the branding material a slightly different flavor than the remainder of the mix.

A pipe or conduit 22 leads from the mixing drum or chamber 16 to a pump 23, which may if desired be a gear pump which will serve to draw the mixture from the drum 16 and expel or deliver it through the pipe 24. The pipe 24 leads through a re-freezing drum 25, to which is supplied a refrigerant by means of inlet and outlet tubes 26 and 27. In this re-freezing chamber the material within the tube 24 will be preferably cooled to a temperature below that within the tube 14. For example, the mixture within the tube 24 may be cooled to a temperature of approximately 10° or 12°, so that it will maintain its shape when delivered into the column of mixture in the conduit 14, and not be diffused through the mass.

The tube 24 leads from the re-freezer 25 to the conduit 14, with which conduit it communicates so that the stiffly frozen pencil of colored mixture issuing from the tube 24 will be delivered to the column of mixture within the pipe 14, and it preferably will be delivered to such a point in the column of mixture that it will be surrounded by or enclosed within the column so as to be carried therein into the container and be distributed throughout the mass within the container. As will now be described, the branding material may be supplied in the form of a continuous pencil or small column, or it may be supplied in the form of a plurality of slugs slightly spaced apart, and the length of the slug and the spacing thereof may be regulated as desired.

The apparatus shown in Figs. 1 and 2 of the drawings is designed to supply the branding material in the form of slugs, and to this end the pump 23 is intermittently driven. The pump is provided with a ratchet wheel 29 mounted upon one of the gear shafts thereof, this wheel being engaged by a pawl 30 on a lever 31 connected by a link 32 to a crank 33. This crank is driven by the motor 34, the shaft 35 of which leads into a housing 36 of a reducing gear mechanism (not shown). This reducing mechanism may be of any desired form to suitably reduce the speed of the motor 34, so that the crank 33 secured upon the shaft 37 leading from the gear box will be rotated at the proper speed. Also leading from the gear box is a shaft 38 upon which is a sprocket 39 connected to the sprocket 40 on shaft 17 by the drive chain 41, so that the shaft 17 may be driven from the same source of power as the pump 23.

As shown in Fig. 3, a forming or shaping die 42 may be inserted in the pipe 24 adjacent the point of communication of this pipe and the conduit 14, so that the branding material will be given a suitable cross-sectional shape before being injected into the main mass of the product. As shown in Fig. 3, this die has an opening of triangular shape to provide for a pencil of that shape. It will be understood, however, that an opening of any shape may be provided in the die according to the mark desired by the manufacturer.

It will be understood that, as the frozen mixture is forced through the freezer 10 and through the conduit 12, a part of this mixture will be by-passed through the circuit formed by the tube 15, the mixing chamber 16, and the tubes 22 and 24, and be returned to the main mass of material in the conduit 14, after being mixed with coloring material and subjected to a freezing process in the re-freezing chamber 25. The coloring material will be supplied to the drum 16 as desired by means of the valve 21, and the paddles 18 driven from the motor 34 will stir and agitate the material so that the coloring matter will be evenly diffused therethrough. It is, of course, understood that the material leaves the freezer 10 under pressure, and this pressure behind it will force it through the pipe 15. As it is frozen, however, to a low degree in the re-freezer 25, additional force may be required to move it through the by-pass circuit and inject it into the column of material in the conduit 14. This is the purpose of the pump 23, which, as shown in Fig. 1, is driven intermittently by the pawl 30 and ratchet 29 from the rotation of the crank 33. This intermittent movement of the pump will tend to cause slugs or short pencils of the branding material to be moved through the die 42 into the column of material in the conduit 14, where they will be broken off by the movement of the material in the conduit, and assume a position within this stream of the mixture and be carried to the container.

Figure 4:
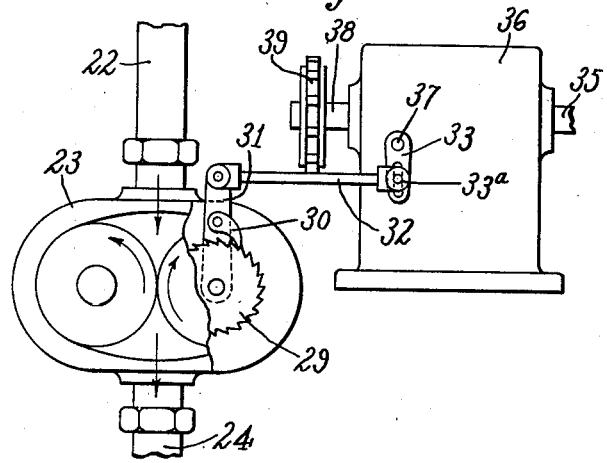
Fig. 4 is a detail view of the pump employed to force the colored substance into the column of cream delivered by the freezer.

As shown in Fig. 4, the link 32 is adjustably connected with the crank 33 by a pin and slot connection, as shown at 33ᵃ, so that the throw of the lever 31 may be adjusted in order to adjust the length of the slugs of branding material delivered to the product, and also adjust the spacing between the slugs. By reason of the fact that the branding material is at a temperature several degrees lower than the mixture in the conduit 14, and therefore frozen harder, it will retain its form and shape while being delivered to the container. The containers, after being filled, are usually placed in a freezing room where the mixture is kept at a low temperature, so that the product will be frozen extremely hard when delivered. The particles of branding material will, therefore, not lose their shape, and will appear in the identical form given them when the cream is scooped from the container by the dealer.

Figure 5:
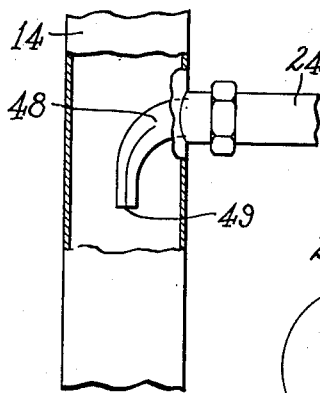
Fig. 5 is a detail view partly in section showing a somewhat modified form of my invention.
Figure 6:
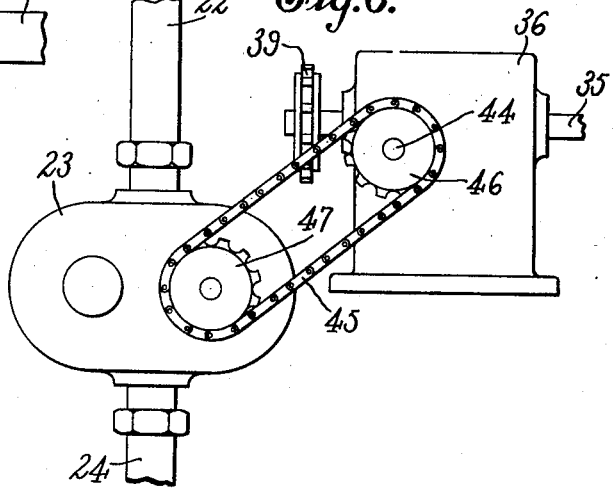
Fig. 6 is an elevational view of the pump drive used in connection with the modification shown in Fig. 5.

In Figs. 5 and 6 of the drawings I have shown a somewhat modified form of my invention for delivering the branding material in a continuous stream or pencil instead of in separate slugs. In this case the same apparatus will be used that is shown in Fig. 1, except that the pump 23 will be continuously operated and may be driven from the shaft 44 by a chain 45 passing over sprockets 46 and 47, the latter being secured to one of the gear shafts of the pump. In this instance the outlet end of the pipe 24 may be provided with an elbow 48 within the conduit 14, so that the delivery end of the elbow 48 will face in the direction of the movement of the material through the conduit. The nozzle or delivery end of the elbow 48 may be shaped, as shown at 49, to serve as the die to properly shape the column of branding material, thus taking the place, in this form of the invention, of the die 42 shown in Figs. 1 and 3.

When the pump is driven continuously the action of the apparatus will be the same as that previously described, except that a continuous pencil of branding material will be moved into the conduit 14 and delivered at a point within this conduit, so that the mass of material being delivered to the freezer will embrace a continuous pencil of branding material of different color and/or flavor, which will be distributed throughout the mass of material in the container to such an extent that it will be practically impossible to take a scoopful of cream therefrom without cutting through the branding material.

The re-freezer 25 may be supplied with a refrigerant from the same source as the freezing drum 10, so that no additional source of refrigerant will be required. Also as the mixture employed for the branding material is removed from that delivered from the freezing drum 10, no separate source of this material will be required. Also it will be apparent that the process of branding or trade-marking the product will be carried out during the passage of the mixture from the freezer to the container without in any way interfering with the continuous operation of the freezer. The branding process may, therefore, be carried out with a minimum of expense, and whether the material is delivered in slugs or in a continuous pencil the product will be properly branded, so that any user will know the source of the product which he purchases.

It will also be understood that my apparatus and process may be employed in other relations, such, for example, as introducing ice cream of other flavors into the main mass of material, and the mixing device 16 may be employed to mix fruits or flavoring material with the mixture passing therethrough, as well as coloring matter. It will also be understood that the invention is applicable to frozen mixtures other than ice cream, and even to other plastic materials where it is desired to brand the same in bulk.

While I have shown and described some preferred embodiments of my invention, it will be understood that it is not to be limited to all of the details shown, but is capable of modification and variation within the spirit of the invention and within the scope of the appended claims.

What I claim is:

1. The method of trade-marking ice cream or other viscous product which comprises conveying a column of the product from a source to a container, projecting into the column slugs of a substance of a contrasting color, delivering said product with the enclosed slugs to the container, and said slugs being at a lower temperature than the column of product into which they are projected.

2. The method of trade-marking ice cream or other plastic products which comprises conveying a mass of the product from a source to a container, removing a portion of the product during transit thereof, coloring said portion to contrast with the remainder, and returning the colored portion to the main body of the product before delivering the same to the container.

3. The method of trade-marking ice cream or other plastic products in bulk which comprises conveying a mass of the product from a source to a container, removing a portion of the product during transit thereof, coloring said portion to contrast with the remainder, and returning the colored portion to the main body of the product under pressure and in a pencil of distinctive cross-sectional shape before delivering the same to the container.

4. The method of trade-marking ice cream or similar products which comprises conveying a mass of the product from a freezer to a container in plastic condition, removing a portion of the product during transit thereof, coloring said portion to contrast with the remainder, and forcing the colored portion into the main body of the product in a plurality of separate slugs before delivering the same to the container.

5. The method of trade-marking ice cream or similar products which comprises conveying a mass of the product from a freezer to a container, removing a portion of the product during transit thereof, coloring said portion to contrast with the remainder, re-freezing said portion to a temperature below that of the remainder of the product, and returning the colored and re-frozen portion to the main body of the product before delivering the same to the container.

6. The method of trade-marking ice cream or similar products which comprises conveying a mass of the product from a freezer to a container, removing a portion of the product during transit thereof, coloring said portion to contrast with the remainder, returning the colored portion to the main body of the product during the conveyance thereof in a plurality of separate slugs before delivering the same to the container, and re-freezing said colored portion whereby the slugs are delivered to the main mass at a lower temperature than the temperature of the latter.

7. In a device of the class described, a source of a plastic product, a conduit to convey the product thereof to a container, a conveying circuit having inlet and outlet ends connected to said conduit whereby a part of the product is passed through said conveying circuit during transit to the container, and means for coloring said part of the product during such passing.

8. In a device of the class described, a source of a frozen product, a conduit to convey said product to a container, a conveying circuit having inlet and outlet ends connected to said conduit whereby a part of the product is passed through said conveying circuit during transit to the container, means for coloring said part of the product during such passing, and a pump in said circuit to force the flow of the product therethrough.

9. In a device of the class described, a source of a frozen product, a conduit to convey said product to a container, a conveying circuit having inlet and outlet ends connected to said conduit whereby a part of the product is passed through said conveying circuit during transit to the container, means for coloring said part of the product during such passing, and means in said circuit to re-freeze the product to a lower temperature than that of the mass in the conduit.

10. In a device of the class described, a source of a frozen product, a conduit to convey said product to a container, a conveying circuit having inlet and outlet ends connected to said conduit whereby a part of the product is passed through said conveying circuit during transit to the container, means for coloring said part of the product during such passing, and means for returning the colored portion to the mass in the conduit in the form of separate slugs.

11. In a device of the class described, a source of a frozen product, a conduit to convey said product to a container, a conveying circuit having inlet and outlet ends connected to said conduit whereby a part of the product is passed through said conveying circuit during transit to the container, means for coloring said part of the product during such passing, and means in said circuit to give said colored portion a desired cross-sectional form before its return to the conduit.

DAVID H. FRIEDMAN, Jr.